US012222635B1

(12) United States Patent
Rider-Hill et al.

(10) Patent No.: US 12,222,635 B1
(45) Date of Patent: Feb. 11, 2025

(54) IMAGE PROJECTION AND DISPLAY APPARATUS AND METHOD

(71) Applicants: Laura Sierra Rider-Hill, Pawtucket, RI (US); Derek Thompson Spychalla, Pawtucket, RI (US)

(72) Inventors: Laura Sierra Rider-Hill, Pawtucket, RI (US); Derek Thompson Spychalla, Pawtucket, RI (US)

( * ) Notice: Subject to any disclaimer, the term of this patent is extended or adjusted under 35 U.S.C. 154(b) by 0 days.

(21) Appl. No.: 18/820,171

(22) Filed: Aug. 29, 2024

(51) Int. Cl.
*G03B 21/10* (2006.01)
*G03B 21/28* (2006.01)

(52) U.S. Cl.
CPC ............ *G03B 21/10* (2013.01); *G03B 21/28* (2013.01)

(58) Field of Classification Search
CPC .... G03B 21/00; G03B 21/005; G03B 21/006; G03B 21/008; G03B 21/10; G03B 21/28; G03B 21/56; G03B 21/145; G03B 21/562; H04N 9/31; H04N 9/315; H04N 9/3105; H04N 9/3141
See application file for complete search history.

(56) References Cited

U.S. PATENT DOCUMENTS

| | | | |
|---|---|---|---|
| 1,283,590 A | 11/1918 | Stavenhagen | |
| 3,191,492 A | 6/1965 | Moutray | |
| 3,292,287 A | 12/1966 | Marn | |
| 7,595,930 B2 | 9/2009 | Adams et al. | |
| 9,022,575 B2 | 5/2015 | Hsu | |
| 9,082,323 B1* | 7/2015 | Dougherty | ............ G09F 23/06 |
| 10,101,582 B2 | 10/2018 | Lin et al. | |
| 11,258,890 B2 | 2/2022 | Griffith | |
| 2006/0238833 A1 | 10/2006 | Chen | |
| 2007/0008608 A1 | 4/2007 | Astill | |
| 2009/0109404 A1* | 4/2009 | Thornton | ............ H04N 13/388 353/10 |
| 2010/0177284 A1 | 7/2010 | Moizio et al. | |
| 2017/0345343 A1* | 11/2017 | Dashe | ................... G09B 29/04 |
| 2021/0072630 A1 | 3/2021 | Zhu et al. | |

* cited by examiner

*Primary Examiner* — Sultan Chowdhury
(74) *Attorney, Agent, or Firm* — Squire Patton Boggs LLP; Sarah Mirza (57) ABSTRACT

Methods and apparatuses for providing a portable and convenient way of projecting and displaying content originating from a mobile device, tablet device, display device, or screen. A method may include connecting a first side panel to a first side edge of a front panel. A second side panel may be connected to a second side edge of the front panel. A rear panel may be connected to a first side edge of the first side panel, a first side edge of the second side panel, and a top edge of the front panel. The rear panel may be disposed at an angle of less than 90 degrees with respective to a horizontal plane of the rear panel. The front panel, the first side panel, and the second side panel may include a translucent, transparent, or semi-transparent material configured to diffuse light.

18 Claims, 12 Drawing Sheets

IMAGE PROJECTION AND DISPLAY APPARATUS AND METHOD

BACKGROUND

Technical Field

Some example embodiments may generally relate to image projection and display. For example, certain example embodiments may relate to apparatuses and/or methods for providing a portable and convenient way of projecting and displaying content originating from a mobile device, tablet device, display device, or screen. In some example embodiments, the content may be projected and displayed in a manner that can provide users with an immersive experience with the content being projected and displayed.

Description of Related Art

Advancements in image projection technology have provided the ability to display visual content generated from an electronic device onto an external surface such as a screen or wall. Many of such devices relate to various display technologies such as, for example, digital light processing (DLP) that incorporate micro-mirrors in a projector to display images, liquid crystal display (LCD) projection that utilize liquid crystals to project images, and light emitting diodes (LEDs) that enable the production of portable image projection devices. Although these types of devices tend to focus on improving image quality, they are generally deficient in meeting the increasing trends and demands in augmented reality and projection to provide consumers with a more immersive experience in the content that they are viewing. Thus, there is a need to improve the current image projection and display technologies to provide a more immersive experience for content consumers, and to provide a simple, convenient, and portable way for consumers to have such experiences.

SUMMARY

Some example embodiments may be directed to an image projection and display apparatus. The image projection and display apparatus may include a front panel, a first side panel connected to a first side edge of the front panel, a second side panel connected to a second side edge of the front panel, and a rear panel connected to a first side edge of the first side panel, a first side edge of the second side panel, and a top edge of the front panel. According to certain example embodiments, the rear panel may be disposed at an angle of less than 90 degrees with respect to a horizontal plane of the rear panel. According to other example embodiments, the front panel, the first side panel, and the second side panel may include a translucent, transparent, or semi-transparent material configured to diffuse light.

Other example embodiments may be directed to a method of constructing an image projection and display apparatus. The method may include connecting a first side panel to a first side edge of a front panel. The method may also include connecting a second side panel to a second side edge of the front panel. The method may further include connecting a rear panel to a first side edge of the first side panel, a first side edge of the second side panel, and a top edge of the front panel. According to certain example embodiments, the rear panel may be disposed at an angle of less than 90 degrees with respective to a horizontal plane of the rear panel. According to other example embodiments, the front panel, the first side panel, and the second side panel may include a translucent, transparent, or semi-transparent material configured to diffuse light.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of an image projection and display apparatus and methods.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Figure 1:
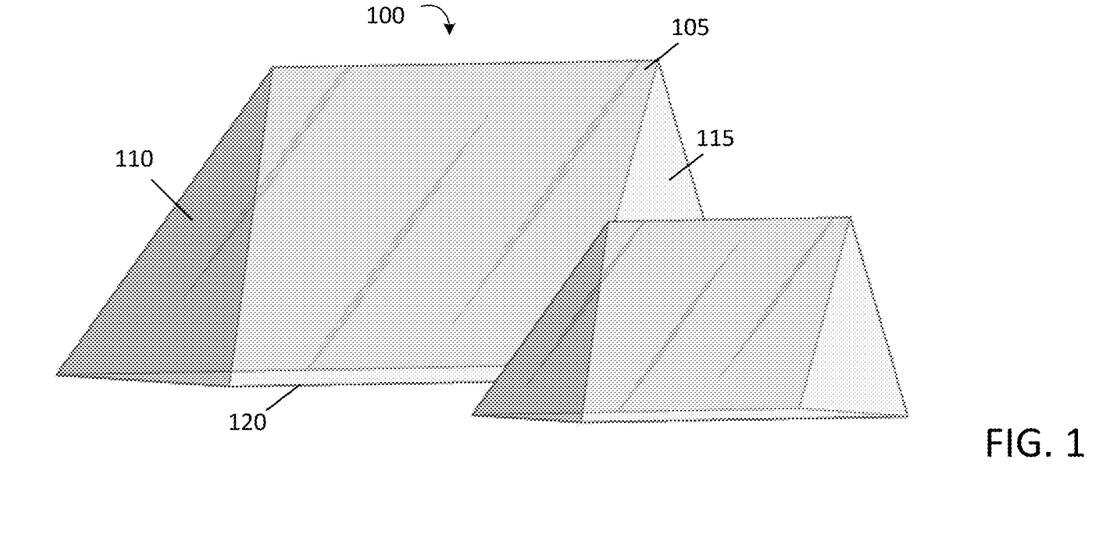
FIG. 1 illustrates an example cover, according to certain example embodiments.

FIG. 1 illustrates an example cover 100, according to certain example embodiments. In some example embodiments, the cover 100 may include panels or a combination of multiple panels that may each be translucent, transparent, or semi-transparent. As illustrated in FIG. 1, the cover 100 may include a back panel 105, side panels 110, 115, and a front panel 120. In certain example embodiments, the front panel 120 may have an interior angle of 60° to 90°. In other example embodiments, the back panel 105 may have an interior angle of 90° or less such as, for example, 50° or between 45° to 60°. Additionally, the front panel 120 may have an interior angle of 90° or less, such as, for example, 60° to 90° or 80° depending on the back panel's 105 angle to ensure proper reflection and viewing angles. In some example embodiments, the back panel 105, side panels 110, 115, and the front panel 120 may constitute one single continuous piece. In other example embodiments, the side panels 110, 115 may be extensions of the back panel 105, or extensions of the front panel 120. In further example embodiments, the back panel 105, side panels 110, 115, and the front panel 120 may all be individual pieces that can be attached together. Each of the panels may be attached by various means including, but not limited to, for example, adhesion, latches, fasteners, snaps, magnets, interlocking, clips, hinges, tongue and groove, or a combination of these attachment means.

As further illustrated in FIG. 1, the cover 100 may be formed of a 3-dimensional (3D) pyramidal shape. However, in other example embodiments, the shape of the cover 100 may not be limited to that illustrated in FIG. 1, and may be formed of other shapes including, but not limited to, for example, a substantially 3D trapezoidal shape. In other example embodiments, the back panel 105, side panels 110, 115, and front panel 120 may be foldable and/or collapsible to become substantially flat.

Figure 2:
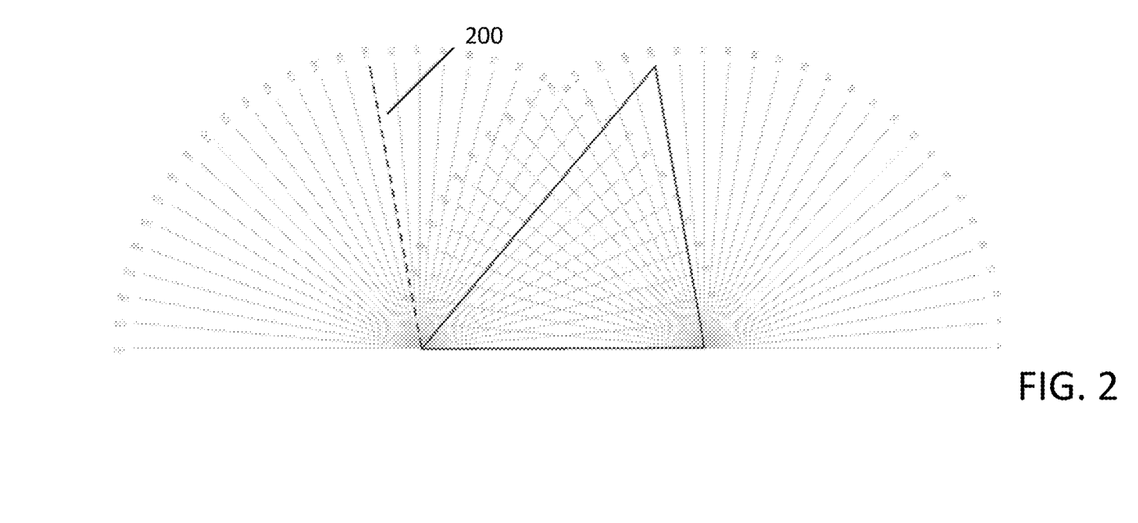
FIG. 2 illustrates a screen reflection angle of the cover, according to certain example embodiments.

FIG. 2 illustrates a screen reflection angle 200 of the cover 100, according to certain example embodiments. For instance, in some example embodiments, the screen reflection angle 200 with respect to a horizontal plane of the cover 100 may be 100°. As illustrated in FIG. 2, the angles start from the front and back base points. Additionally, the back panel 105 may have an interior angle of 50°, the front panel 120 may have an interior angle of 80°, and a front panel exterior angle and reflection angle may be 100°. According to certain example embodiments, the exterior front panel angle may mimic the reflection angle.

Figure 3:
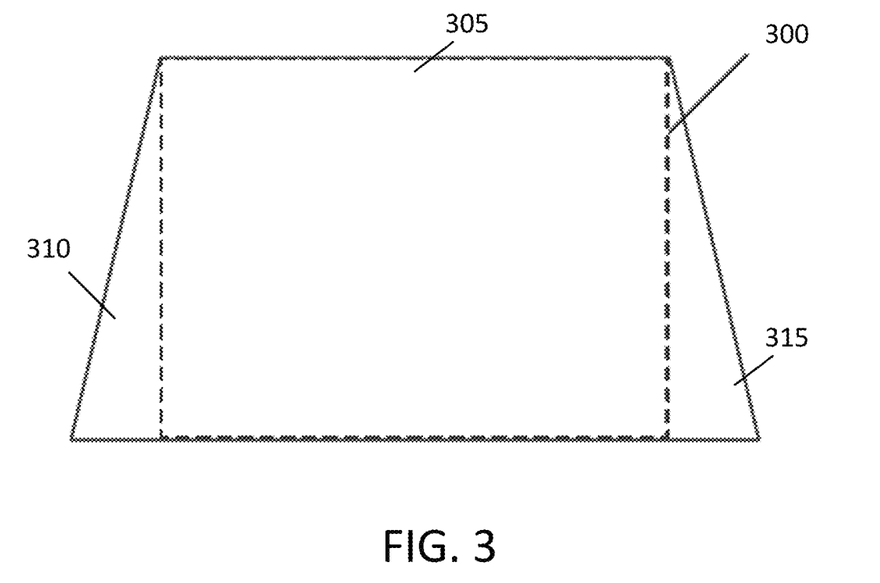
FIG. 3 illustrates a front view of the cover, according to certain example embodiments.

FIG. 3 illustrates a front view of the cover 100 with side panels 310, 315, according to certain example embodiments. The front view shows a viewing area 300 through the front panel 305 of the cover 100. In some example embodiments, the viewing area 300 may be a 4:3 ratio viewing area.

Figure 4:
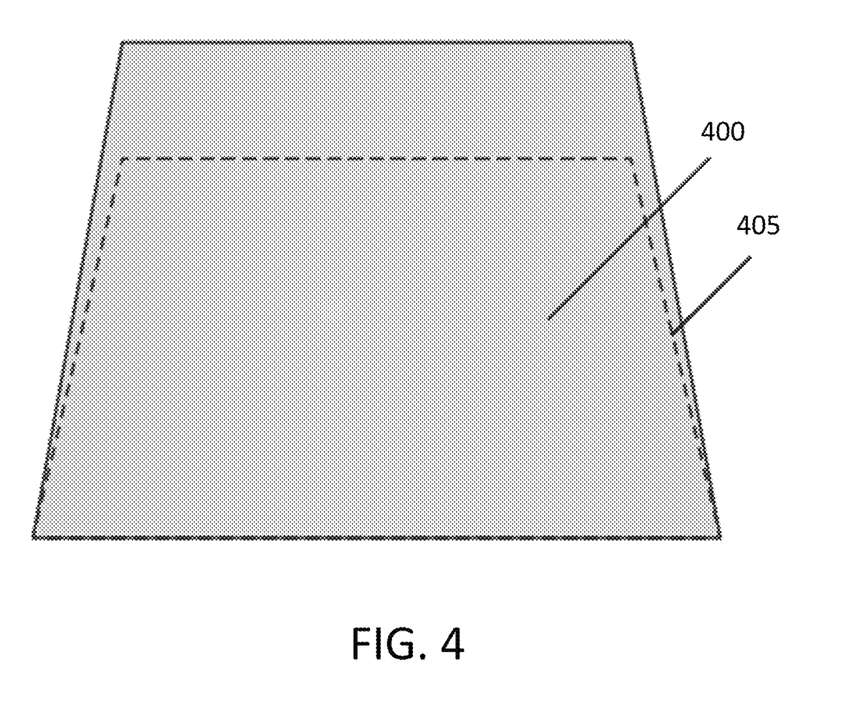
FIG. 4 illustrates a back view of the cover, according to certain example embodiments.

FIG. 4 illustrates a back view of the cover 100, according to certain example embodiments. As illustrated in FIG. 4, the cover 100 may include a back panel 400. In some example embodiments, the back panel 400 may include a reflective material configured to reflect light and/or images from a source, which may include, but not limited to, for example, a mobile device, tablet device, display device, or screen. In some example embodiments, the reflective material may be a reflective film that a has a certain reflective percentage such as, for example, 98% reflectiveness. In other example embodiments, the reflective material may be glass, reflective paint, reflective mirroring, mirrors, highly reflective mylar film, reflective film, or optical films, 3M™ brightness films (BEF). In further example embodiments, the back panel 400 may also include a brightness enhancement film in combination with the reflective material. In certain example embodiments, the brightness film may be disposed on top of the reflective film to enhance the brightness of images and/or light from the mobile device, tablet device, display device, or screen. However, in other example embodiments, both the reflective material and the brightness film do not necessarily need to be combined. For example, the back panel 400 may be a multi-film or a single film panel. If, for example, the back panel 400 is a single film panel, the back panel 400 may include reflective properties contained in the panel itself, or the back panel 400 may include the reflective film.

According to certain example embodiments, the brightness enhancement film may be BEF. According to some example embodiments, the cover 100 may include a combination of zero to two layers of films (e.g., brightness film/layer and reflective film/layer. For example, the panels (back, front, and sides) may be made of reflective material and not require any film(s). In other example embodiments, the brightness enhancement film may be a single reflective film (3M™ ESR or highly-reflective mylar using adhesive and applied to the back panel. In other example embodiments, one reflective layer and one brightness enhancement layer (3M™ brightness enhancement films) may be used and adhered to the back panel 400. The brightness film may also be adhered to the reflective layer on top.

According to other example embodiments, one brightness layer may be used on transparent models of the cover 100 to provide a clearer reflection and visibility during the day. According to certain example embodiments, the thickness of the brightness enhancement film may be between 0.065 mm to 7 mm depending on the film/material and the quality. Additionally, the size and dimension of the brightness enhancement film may depend on the back panel size as it may cover the entire back panel inside the cover 100. In some example embodiments, the height of the cover 100 may be as tall as the width of the display screen or less.

In certain example embodiments, the front panel may be configured at an angle of 90° or less, and the back panel 400 may be configured at an angle, such as, for example, an angle less than 90°. The back panel 400 may include an angled back panel height 405. In some example embodiments, when displaying an image, the back panel 400 angle may be 40° to 70° such as, for example, 45° to 65°, or 45° to 50° with the least distortion with 45° being 1:1 reflection. With an angle of 45° to 50°, it may be possible to prevent warping of the cover 100, and provide a quality image that is accurate and visible through the translucent material of the cover 100. The angle of 45° to 50° may also allow for optimal watching and light diffusion that create a unique viewing experience. In other example embodiments, the front panel of the cover 100 may match the width of the screen, and mirroring the reflection to ensure a 1:1 image reflection with minimal repeat at the top of the image.

Figure 5:
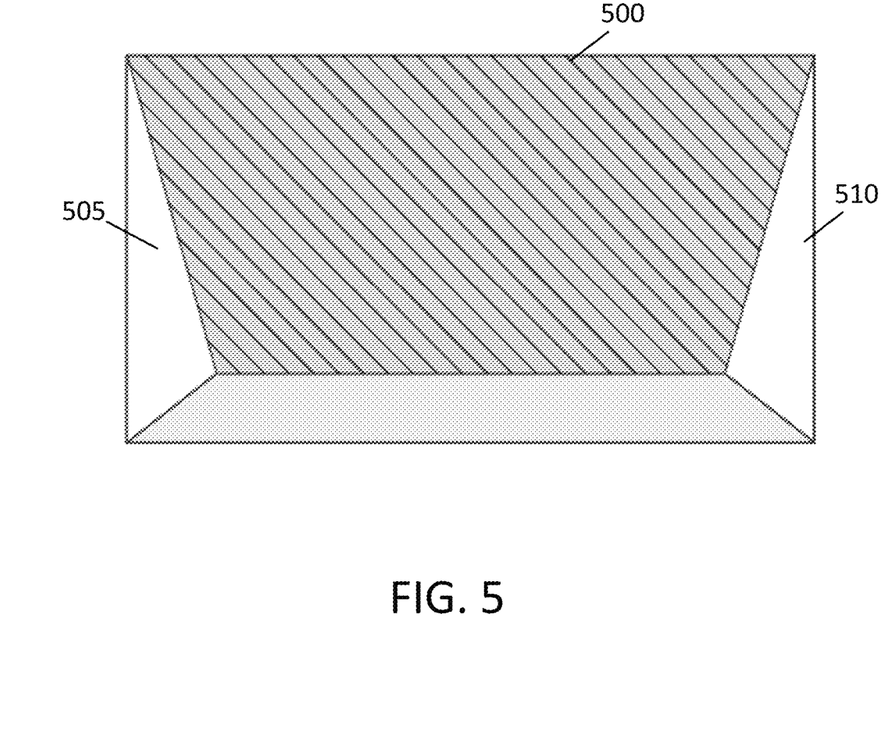
FIG. 5 illustrates a top view of the cover, according to certain example embodiments.

FIG. 5 illustrates a top view of the cover 100, according to certain example embodiments. As illustrated in FIG. 5, the cover 100 may include a reflective back panel 500, side panels 505, 510, and a front panel 515. In some example embodiments, the back panel 500 may be positioned at an angle relative to a horizontal plane of the cover 100, and the angle may be one that is less than 90°. According to certain example embodiments, the side panels 505, 510 and the front panel 515 may be translucent, transparent, or semi-transparent.

According to certain example embodiments, the reflective back panel 500 may have an angle of 45° to 60° for a front viewing experience. The exterior angle of the front panel 515 may be double the angle of the back panel 500, and the height of the front panel 515 may match the width of the screen to ensure a 1:1 image, and so that nothing is cut off or repeated. According to some example embodiments, the height of the front panel 515 may be different from the angled height, where the angled height is the angle of the front panel 515 shifted to meet the reflective back panel 500.

In certain example embodiments, a base (e.g., bottom area of the cover 100 defined by the length and width of the screen) of the cover 100 may match the length of the screen to ensure that the cover 100 covers the entire screen area. In some example embodiments, the cover 100 may cover the entire screen or cover a viewing screen size where content displayed on the screen is smaller than the length and/or width of the screen. In other example embodiments, the side panels 505, 510 may have a length that matches the screen at the base. As illustrated in FIG. 5, the cover 100 may include a top edge 520, which may be less than or equal to the full length of the screen. For instance, in some example embodiments, the cover 100 may have a 4:3 ratio of the front viewing angle, which may serve as the decider of the top edge length. With a 4:3 ratio, it may be possible to bring in the sides to allow for more light diffusion and more of a light show experience while maintaining a common enjoyable viewing format. According to other example embodiments, the structure of the cover 100 may be dependent upon the angle of the back panel 500 and the screen dimensions.

Figure 6:
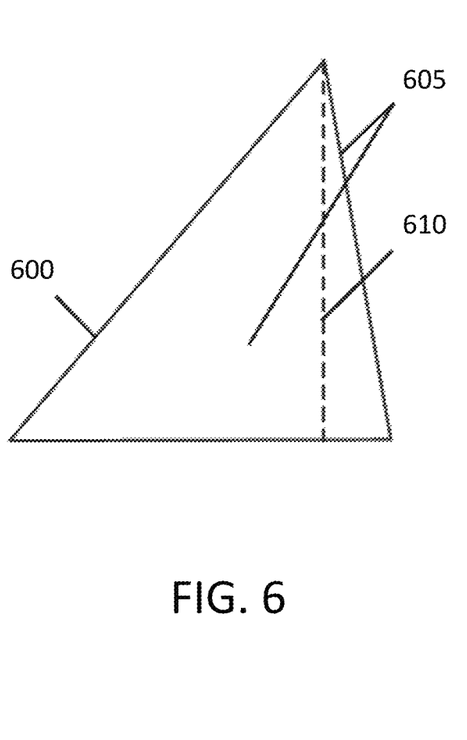
FIG. 6 illustrates a side view of the cover, according to certain example embodiments.

FIG. 6 illustrates a side view of the cover 100, according to certain example embodiments. Illustrated in FIG. 6 are the reflective back panel 600, side panels 605, and center point/height 610 of the cover 100. In some example embodiments, the center point/height 610 of the cover 100 may be dependent upon dimensions of the screen. In one example embodiment, with the width of the screen as the height of the front panel (not angled height), the back panel may be placed at the 45° to 50° angle, and connect the length of the back panel to the front panel.

Figure 7:
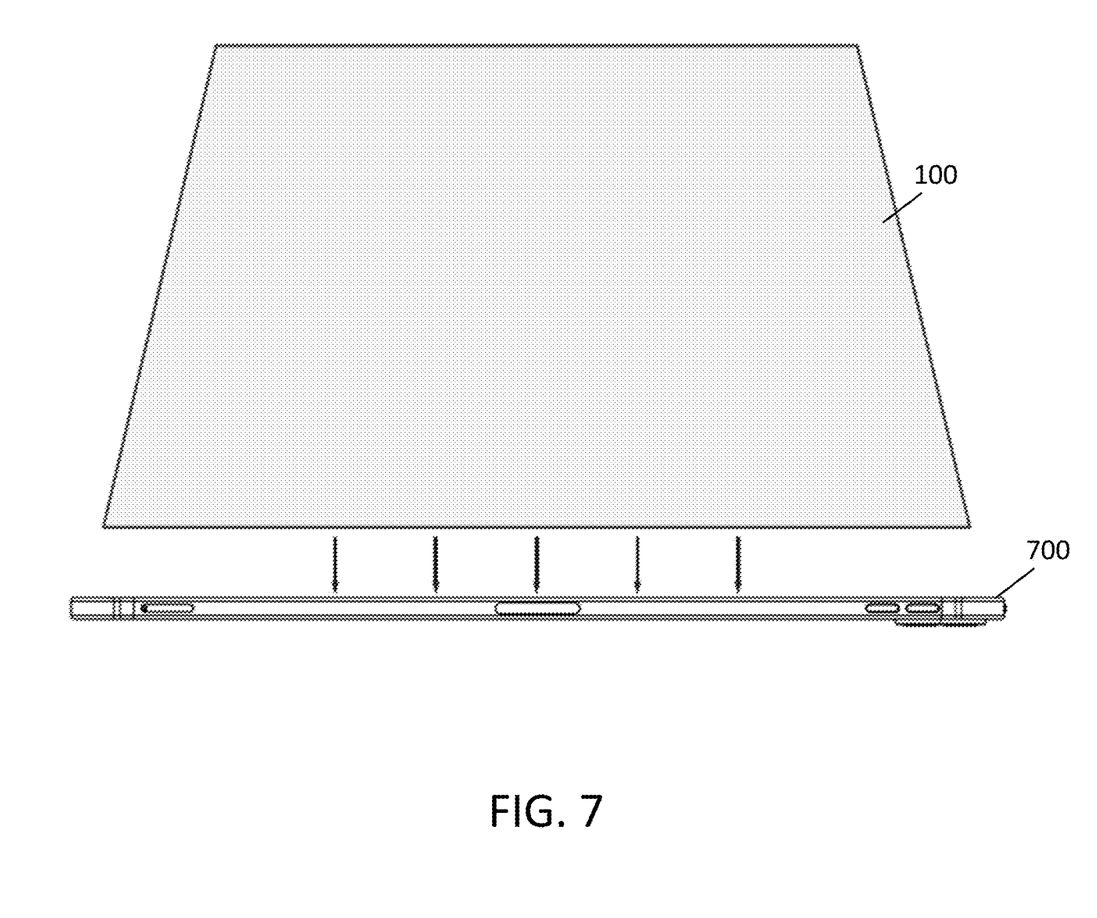
FIG. 7 illustrates a front view of the cover over a display device, according to certain example embodiments.

FIG. 7 illustrates a front view of the cover 100 over a display device 700, according to certain example embodiments. In certain example embodiments, the cover 100 may be placed on top of the display device 700 completely covering a screen of the display device 700 such that images and/or light emanating from the screen of the display device 700 are fully captured by the cover 100. In further example embodiments, the cover 100 may cover the entire screen or cover a viewing screen size of the display device 700. In other example embodiments, the display device 700 may be a mobile device or a fixed device, or may just be a screen capable of emanating images and/or light. According to some example embodiments, the screen/display of the display device may be of various types such as, for example, a liquid-crystal display (LCD) display, an in-plane switching (IPS) display/monitor, a light-emitting diode (LED) display, or various mobile phone displays. According to other example embodiments, the cover 100 may be held on the display device/screen via imbedded magnets or interlocking mechanisms, clips, adapters/cases, or embedded magnets attached to an accessory accompaniment.

Figure 8:
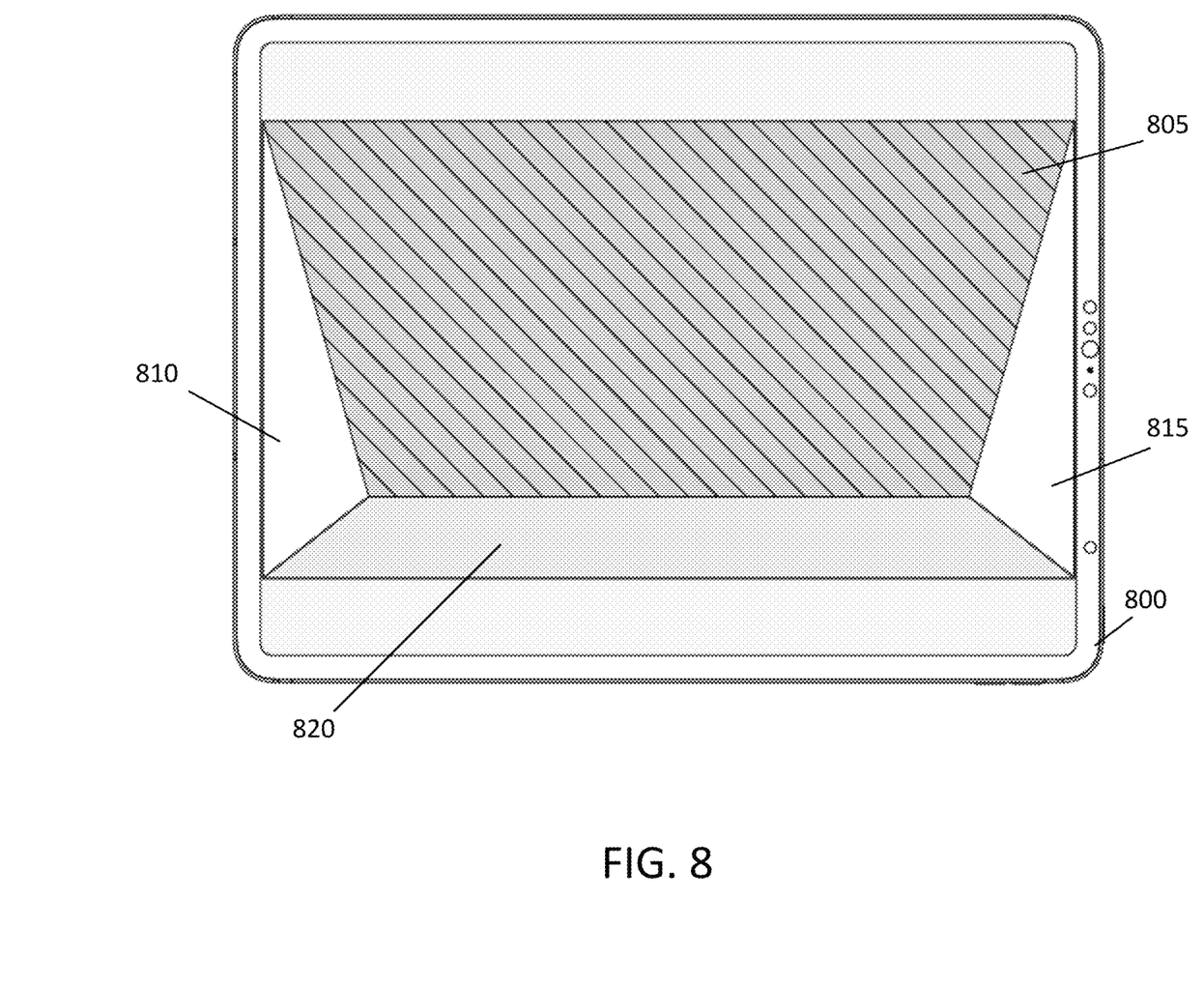
FIG. 8 illustrates a top view of the cover over the display device, according to certain example embodiments.

FIG. 8 illustrates a top view of the cover 100 over the display device 800, according to certain example embodiments. As illustrated in FIG. 8, the cover 100 may include the reflective back panel 805, side panels 810, 815, and the front panel 820. The cover 100 may be placed on top of a screen of the display device 800 as to fully encapsulate images and/or light emanating from the screen. In other example embodiments, the cover 100 may cover the entire screen or cover a viewing screen size of the display device 800. In some example embodiments, the back panel 805, side panels 810, 815, and the front panel 820 may have a certain thickness such as, for example, 5 mm to 10 mm thick. For instance, in some example embodiments, the thicknesses of each of the panels may be 5 mm to 6 mm, which may achieve improved visibility, color, saturation, black levels, and light show effects (e.g., diffusion). With a thickness greater than 7 mm, it may be possible to achieve less visibility, but an improved 360° viewing/light show experience.

In other example embodiments, the thickness of the back panel 805, side panels 810, 815, and front panel 820 may be greater than 10 mm. However, in some example embodiments, the thickness of each panel of the cover may have the same thickness, which may ensure that the same experience can be achieved from any angle. In some example embodiments, with a front viewing model of the cover 100, the reflective back panel 805 may be slightly thicker than the other panels of the cover 100 due to the addition of the films and reflective materials, and due to the potential to add additional structure. According to some example embodiments, use of a thicker material for the panels may result in more light diffusion and a better overall light show.

According to certain example embodiments, the side panels 810, 815 and the front panel 820 may be made of a translucent material that enables images and/or light from the screen of the display device reflected from the reflective back panel 805 to be visible from outside the cover 100. In some example embodiments the translucent material may be a milky-like mylar material, or a polytetrafluoroethylene (PTFE) plastic material. In certain example embodiments, the mylar material may be capable of reflecting images/light, diffusing images/light, and be translucent enough to enable images/light captured in the cover 100 and reflected from the reflective back panel 805 to be visible from the exterior of the cover 100.

In some example embodiments, a brightness film may be disposed on each of the side panels 810, 815 and the front panel 820 to improve the clarity of the images/light reflected from the reflective back panel 805. In other example embodiments, the front panel 820, side panels 810, 815, and reflective back panel 805 may have reflective and diffusion properties to create a diffusion effect. Due to the translucent properties of the material of the cover 100, when light from the edge of the screen hits the material, it is scattered upward from the front and sides mimicking the colors, movement, and brilliance of the screen to create a unique light show at the sides and front of the cover 100. As such, it is possible to create a 3-dimensional (3D) effect/parallax effect where a light show occurs in front of the reflected content, and adds a unique viewing experience from 180° around the cover 100. Additionally, the sloped angles of the sides and front of the cover may also act to capture more of the light from the screen to enhance the viewing effects.

For instance, the front panel 820, side panels 810, 815, and reflective back panel 805 may have reflective and/or diffusion properties depending on the configuration. In some example embodiments, the cover 100 may have a back panel that includes a reflective film, and translucent light diffusing sides and front. In other example embodiments, the cover 100 may include a reflective transparent back panel with reflective transparent sides and front. In further example embodiments, the cover 100 may exhibit full light diffusion with no reflective material in any of the panels. However, in other embodiments, the panels of the cover 100 are not limited to the material combinations described above, and may have various different combinations of materials and films to create a unique experience in a variety of different ways.

Figure 9:
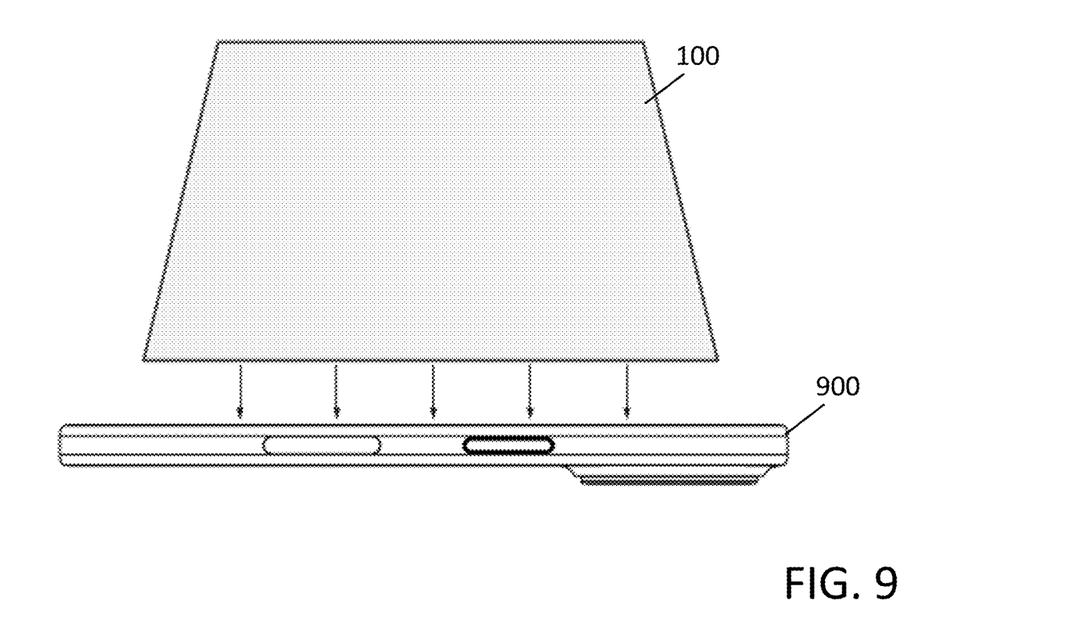
FIG. 9 illustrates a front view of the cover over the display device, according to certain example embodiments.

FIG. 9 illustrates a front view of the cover 100 over the display device 900. Similar to FIG. 7, the cover 100 may be placed on top of the display device 900 completely covering a screen of the display device 900 such that images and/or light emanating from the screen of the display device 900 are fully captured by the cover 100. In other example embodiments, the cover 100 may cover the entire screen or cover a viewing screen size of the display device 900. Additionally, the cover 100 may be positioned such that the side panels and the front panel engage the edges of the screen to create a unique light show within the cover 100 and emanating to an exterior environment of the cover 100, and project a projection of the image from the display device 900.

Figure 10:
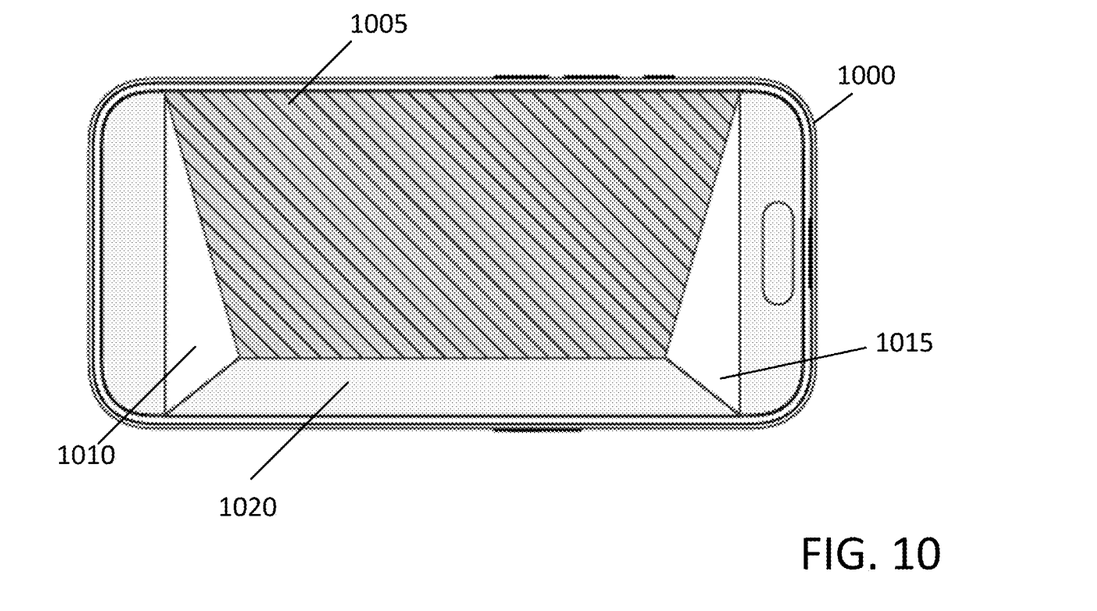
FIG. 10 illustrates another top view of the cover over a display device, according to certain example embodiments.

FIG. 10 illustrates another top view of the cover 100 over the display device 1000. Similar to FIG. 8, the cover 100 may be placed on top of a screen of the display device 1000 as to fully encapsulate images and/or light emanating from the screen. In other example embodiments, the cover 100 may cover the entire screen or cover a viewing screen size of the display device 1000. FIG. 10 also illustrates the cover 100 with a reflective back panel 1005, side panels 1010, 1015, and a front panel 1020. According to certain example embodiments, the reflective back panel 1005 may be positioned at an angle of 90° or less such as, for example, at an angle of 45° to 60° to allow for a unique viewing experience.

Figure 11:
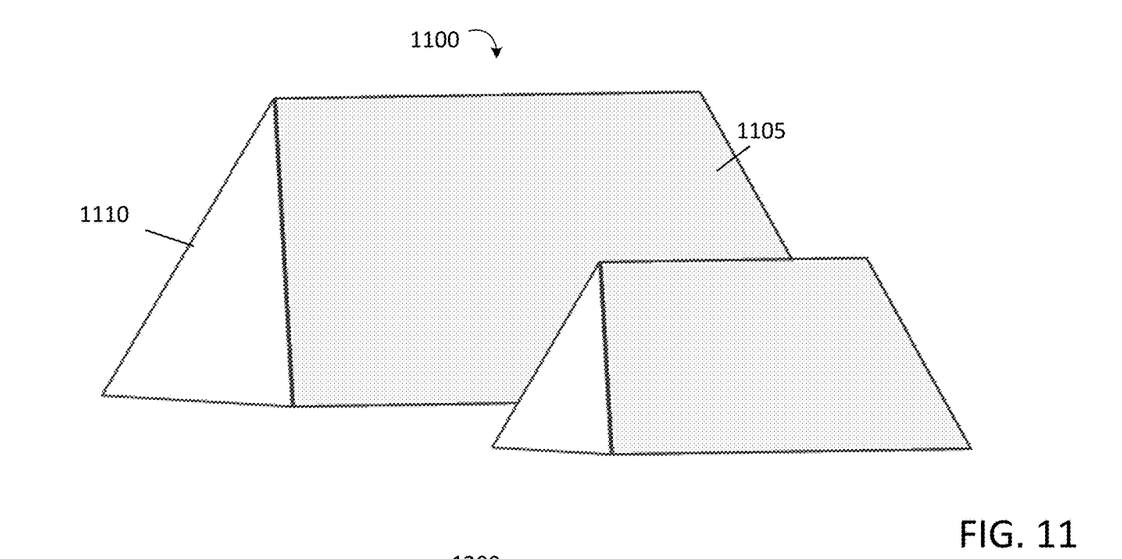
FIG. 11 illustrates another example cover, according to certain example embodiments.

FIG. 11 illustrates another example cover 1100, according to certain example embodiments. Similar to the cover 100, the cover 1100 may include panels or a combination of multiple panels that may each be translucent, transparent, or semi-transparent. As illustrated in FIG. 11, the cover 1100 may include a back panel, side panels 1110, and a front panel 1105. In some example embodiments, the back panel, side panels 1110, and front panel 1105 may constitute one single continuous piece. In other example embodiments, the side panels 1110 may be extensions of the back panel, or extensions of the front panel 1105. In further example embodiments, the back panel, side panels 1110, and the front panel 1105 may all be individual pieces that can be attached together. Each of the panels may be attached by various means including, but not limited to, for example, adhesion, latches, fasteners, hinges, or a combination of these attachment means.

According to certain example embodiments, the back panel, side panels 1110, and front panel 1105 may be made of a semi-transparent frosted/matte material that completely obscures the details of the screen, and only conveys light and colors. Since the material of these panels is matte, it may be possible to prevent reflections on the exterior that may be created from other light sources in the surrounding environment (e.g., room). As illustrated in FIG. 11, the cover 1100 may have a substantially triangular prism shape where the back panel and the front panel 1105 are at similar angle degrees (e.g., 60° and) 60°. In some example embodiments, the back panel, front panel 1105, and side panels 1110 of the cover 1100 may not have any additional films for 360° viewing. In other example embodiments, the cover 1100 may have a less angular shape, and instead have a more rounded/dome shape with rounded corners/edges.

As further illustrated in FIG. 11, the cover 1100 may be formed of a 3D triangular shape or pyramidal shape. However, in other example embodiments, the shape of the cover 1100 may not be limited to that illustrated in FIG. 11, and may be formed of other shapes including, but not limited to, for example, a substantially trapezoidal shape. In other example embodiments, the back panel, side panels 1110, and front panel 1105 may be foldable and/or collapsable to become substantially flat.

Figure 12:
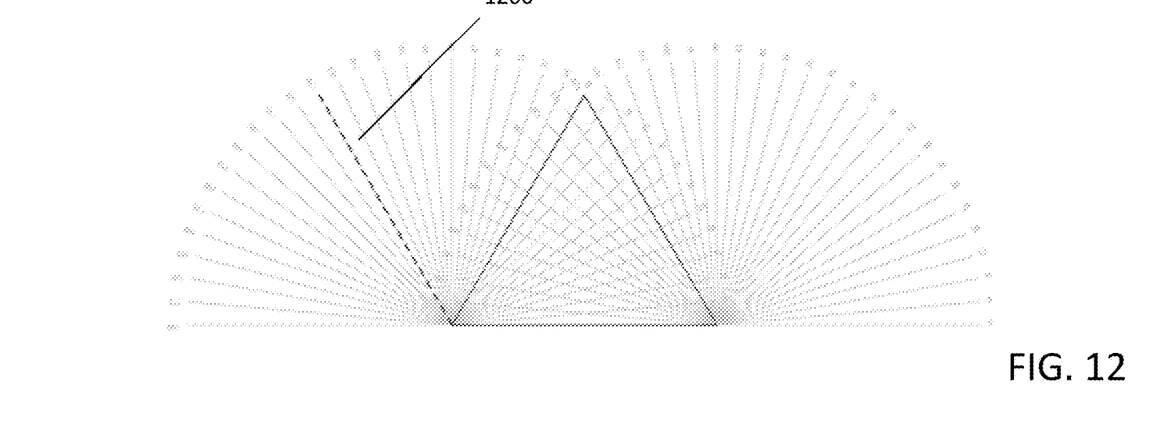
FIG. 12 illustrates another screen reflection angle, according to certain example embodiments.

FIG. 12 illustrates another screen reflection angle 1200 of the cover 1100, according to certain example embodiments. For instance, in some example embodiments the screen reflection angle 1200 with respect to a horizontal plane of the cover 1100 may be 120°. Similar to FIG. 2, the dashed line represents the reflected angle. In some example embodiments, the frosted material of the cover 1100 and the thickness of the panel materials may affect the light diffusion effect created by the cover 1100.

Figure 13:
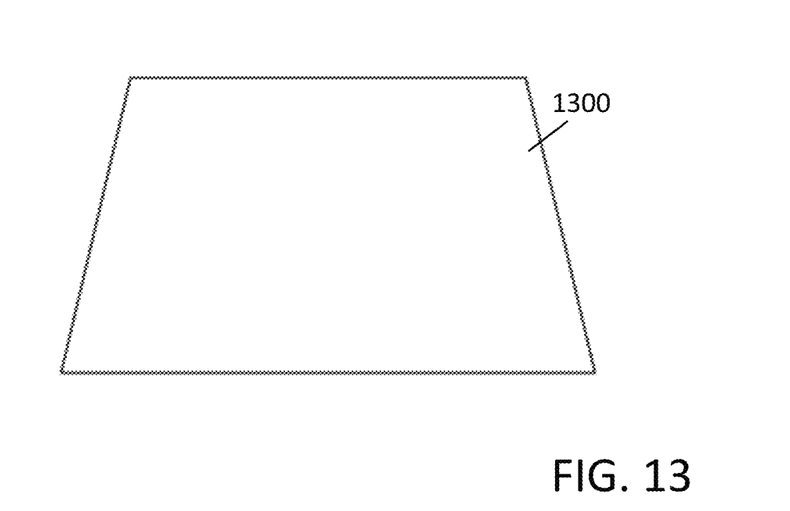
FIG. 13 illustrates a front view of the another example cover, according to certain example embodiments.

FIG. 13 illustrates a front view of the cover 1100, according to certain example embodiments. As illustrated in FIG. 13, the cover 1100 includes a front panel 1300.

Figure 14:
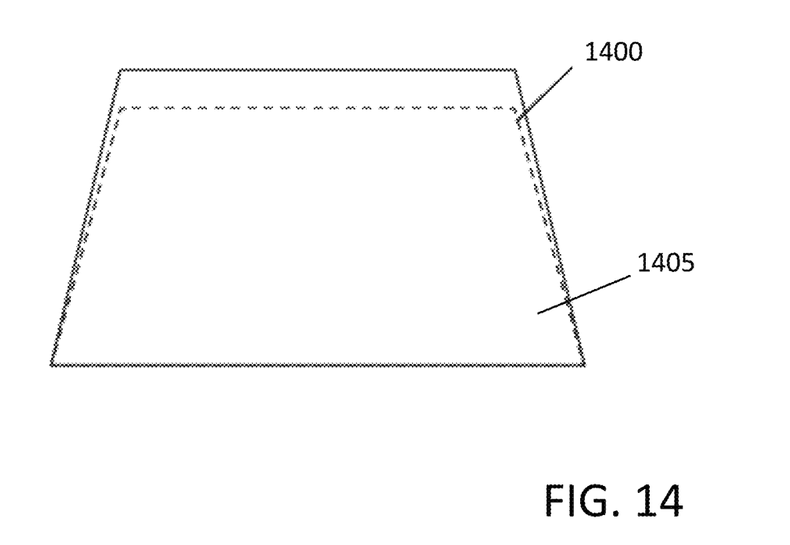
FIG. 14 illustrates a back view of the another example cover, according to certain example embodiments.

FIG. 14 illustrates a back view of the cover 1100, according to certain example embodiments. The back view illustrates a back panel 1400. In some example embodiments, the back panel 1400 may include a reflective material configured to reflect light and/or images from a source, which may include, but not limited to, for example, a mobile device, tablet device, display device, or screen. In some example embodiments, the reflective material may be similar to that of the reflective material of the cover 100 described herein. Similar to the cover 100, the back panel 1400 of the cover 1100 may also include a brightness enhancement film in combination with the reflective material. In certain example embodiments, the brightness film may be disposed on top of the reflective film to enhance the brightness of images and/or light from the mobile device, tablet device, display device, or screen. However, other example embodiments, both the reflective material and the brightness film do not necessarily need to be combined. For example, the back panel 1400 may be a multi-film or a single film panel. If, for example, the back panel 1400 is a single film panel, the back panel 1400 may include reflective properties contained in the panel itself, or the back panel 1400 may include the reflective film. In other example embodiments, rather than having any film(s), the back panel 1400 of the cover 1100 may be made of a frosted material configured to obscure the screen and defuse light to create a 360° viewing experience.

In certain example embodiments, the back panel 1400 may be configured at an angle, such as, for example, an angle less than 90°. The back panel 1400 may include an angled back panel height 1405. According to certain example embodiments, the back panel 1400 may be set to an angle of 60°. However, in other example embodiments, the angle of the back panel 1400 is not limited to 60°, and may have angles below or above 60°.

Figures 15, 16:
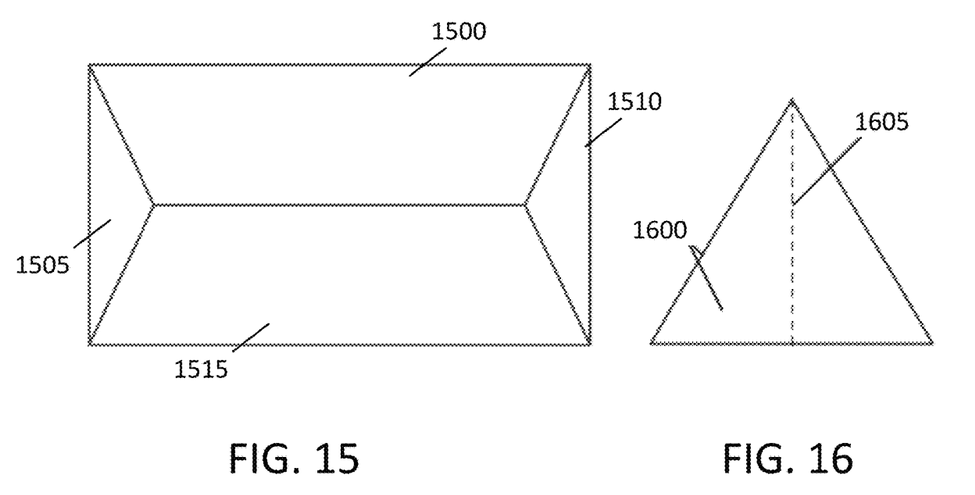
FIG. 15 illustrates a top view of the another example cover, according to certain example embodiments.
FIG. 16 illustrates a side view of the another example cover, according to certain example embodiments.

FIG. 15 illustrates a top view of the cover 1100, according to certain example embodiments. As illustrated in FIG. 15, the cover 1100 may include a reflective back panel 1500, side panels 1505, 1510, and a front panel 1515. In some example embodiments, the back panel 1500 may be positioned at an angle relative to a horizontal plane of the cover 1100, and the angle may be one that is less than 90°. According to certain example embodiments, the side panels 1505, 1510 and the front panel 1515 may be translucent, transparent, or semi-transparent.

According to certain example embodiments, the reflective back panel 1500 may have an angle of 45° to 60°. The front panel 1515 may have an exterior angle that is double the angle of the back panel 1500, and the height of the front panel 1515 (different from the angled height) may match the width of the screen to ensure a 1:1 image, and nothing is cut off or repeated. The length of the cover 1100 may match the length of the display screen to ensure it is covering the entire display screen area. In other example embodiments, the cover 1100 may cover the entire screen or cover a viewing screen size of the display device. The side panels 1505, 1510 may match the display screen width at the base, and the top edge of the cover 1100 may be less than or equal to the full length of the display screen. However, in some example embodiments, a 4:3 ratio matching the front viewing angle may be used to act as the decider of the top edge length. According to certain example embodiments, the dimensions of the cover 1100 may make it possible to bring in the sides to allow for more light diffusion and more of a light show experience while also maintaining an enjoyable common viewing format.

FIG. 16 illustrates a side view of the cover 1100, according to certain example embodiments. Illustrated in FIG. 16 are the side panels 1600, and a center point/height 1605 of the cover 1100. In certain example embodiments, the side panels 1600 may be a type of frosted panels. In some example embodiments, the center point/height 1605 of the cover 1100 may be dependent on the dimensions of the display screen. For example, using the width of the display screen to act as the height of the front panel (not angled height), the back panel may be placed at an angle of 60°, and the length of the back panel may be connected to the front panel.

Figure 17:
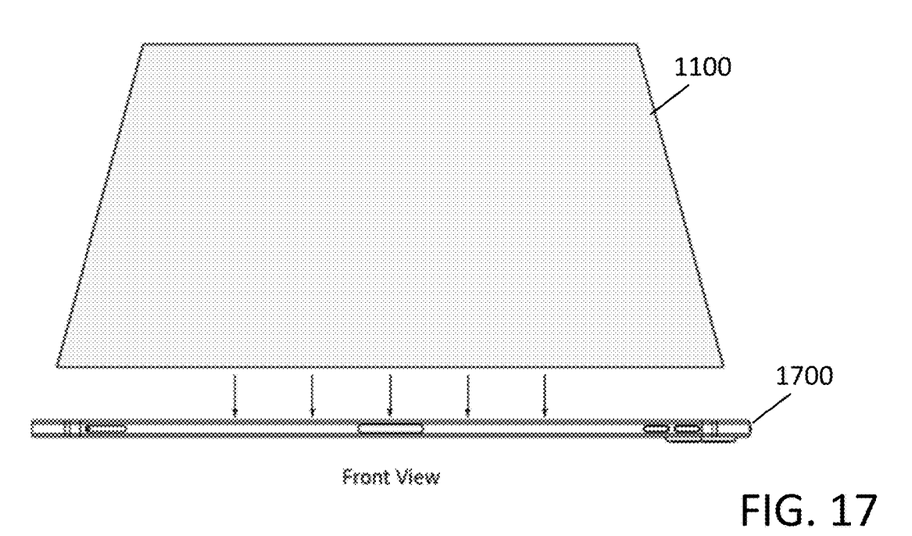
FIG. 17 illustrates a front view of the another example cover over the display device, according to certain example embodiments.

FIG. 17 illustrates a front view of the cover 1100 over a display device 1700, according to certain example embodiments. In certain example embodiments, the cover 1100 may be placed on top of the display device 1700 completely covering a screen of the display device 1700 such that images and/or light emanating from the screen of the display device 1700 are fully captured by the cover 1100. In further example embodiments, the cover 1100 may cover the entire screen or cover a viewing screen size of the display device 1700. In other example embodiments, the display device 1700 may be a mobile device or a fixed device, or may just be a screen capable of emanating images and/or light. According to some example embodiments, the screen/display of the display device may be of various types such as, for example, an LCD display, an IPS display/monitor, an LED display, or various mobile phone displays. According to certain example embodiments, the cover 1100 may be secured to the display device 1700 similar to how the cover 100 may be secured to the display device 700 described herein.

Figure 18:
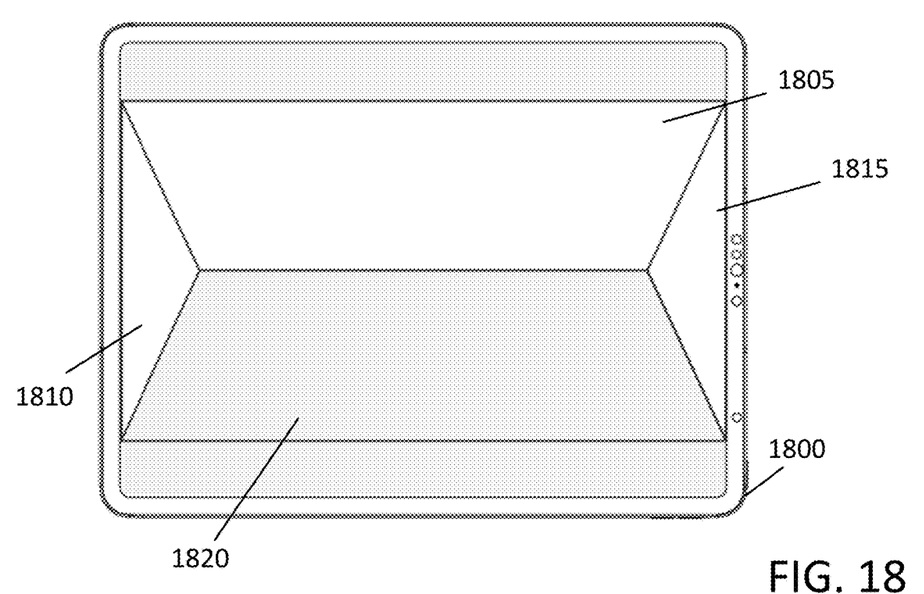
FIG. 18 illustrates a top view of the another example cover over the display device, according to certain example embodiments.

FIG. 18 illustrates a top view of the cover 1100 over the display device 1800, according to certain example embodiments. As illustrated in FIG. 18, the cover 1100 may include the reflective back panel 1805, side panels 1810, 1815, and the front panel 1820. The cover 1100 may be placed on top of a screen of the display device 1800 as to fully encapsulate images and/or light emanating from the screen. In other example embodiments, the cover 1100 may cover the entire screen or cover a viewing screen size of the display device 1800. In some example embodiments, the back panel 1805, side panels 1810, 1815, and the front panel 1820 may have a certain thickness such as, for example, 5 mm to 10 mm thick. Similar to the cover 100, the side panels 1810, 1815 and the front panel 1820 may be made of a translucent material that enables images and/or light from the screen of the display device reflected from the reflective back panel 1805 to be visible from outside the cover 1100. In some example embodiments the translucent material may be a milky-like mylar material, or a PTFE plastic material. In certain example embodiments, the mylar material may be capable of reflecting images/light, diffusing images/light, and be translucent enough to enable images/light captured in the cover 1100 and reflected from the reflective back panel 1805 to be visible from the exterior of the cover 1100.

In some example embodiments, a brightness film may be disposed on each of the side panels 1810, 1815 and the front panel 1820 to improve the clarity of the images/light reflected from the reflective back panel 1805. In other example embodiments, the front panel 1820 may have reflective and diffusion properties to create a diffusion effect.

Figure 19:
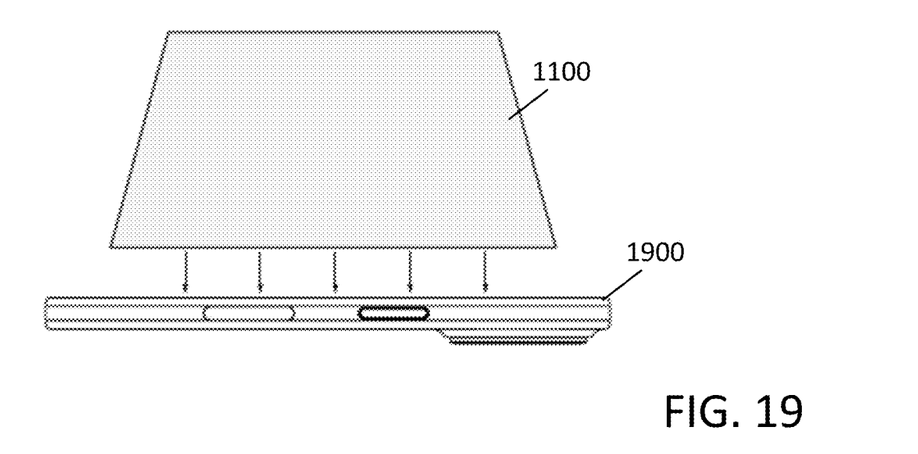
FIG. 19 illustrates a front view of the another example cover over the display device, according to certain example embodiments.

FIG. 19 illustrates a front view of the cover 1100 over the display device 1900. Similar to FIG. 17, the cover 1100 may be placed on top of the display device 1900 completely covering a screen of the display device 1900 such that images and/or light emanating from the screen of the display device 1900 are fully captured by the cover 1100. In other example embodiments, the cover 1100 may cover the entire screen or cover a viewing screen size of the display device 1900. Additionally, the cover 1100 may be positioned such that the side panels and the front panel engage the edges of the screen to create a unique light show within the cover 1100 and emanating to an exterior environment of the cover 1100. For instance, the cover 1100 may allow light emitted to diffuse within the walls of the cover 1100 allowing for a 360° viewing experience, and act as a lighting or atmospheric device.

Figure 20:
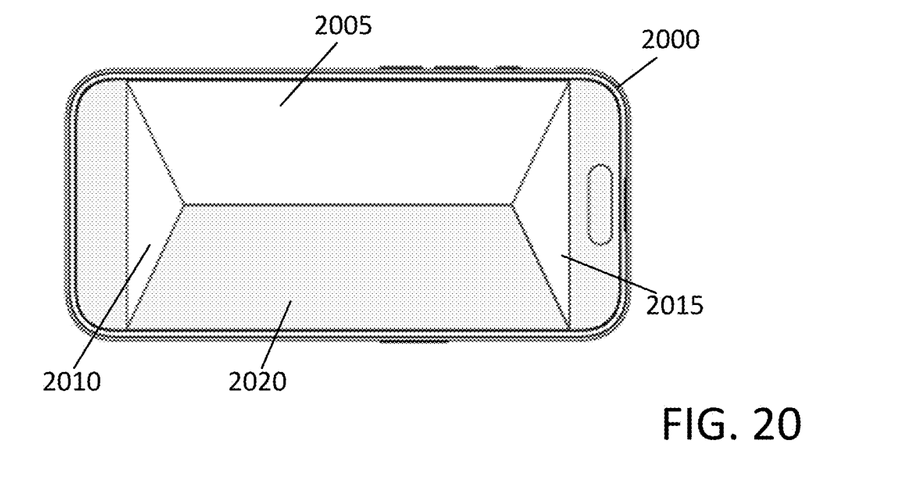
FIG. 20 illustrates a top view of the another example cover over the display device, according to certain example embodiments.

FIG. 20 illustrates another top view of the cover 1100 over the display device 2000. Similar to FIG. 18, the cover 1100 may be placed on top of a screen of the display device 2000 as to fully encapsulate images and/or light emanating from the screen. In other example embodiments, the cover 1100 may cover the entire screen or cover a viewing screen size of the display device 2000. FIG. 20 also illustrates the cover 1100 with a reflective back panel 1005, side panels 2010, 2015, and a front panel 2020. According to certain example embodiments, the reflective back panel 2005 may be positioned at an angle of 90° or less such as, for example, at an angle of 45° to 60° (e.g., 90° or less) to allow for a unique viewing experience.

Figure 21:
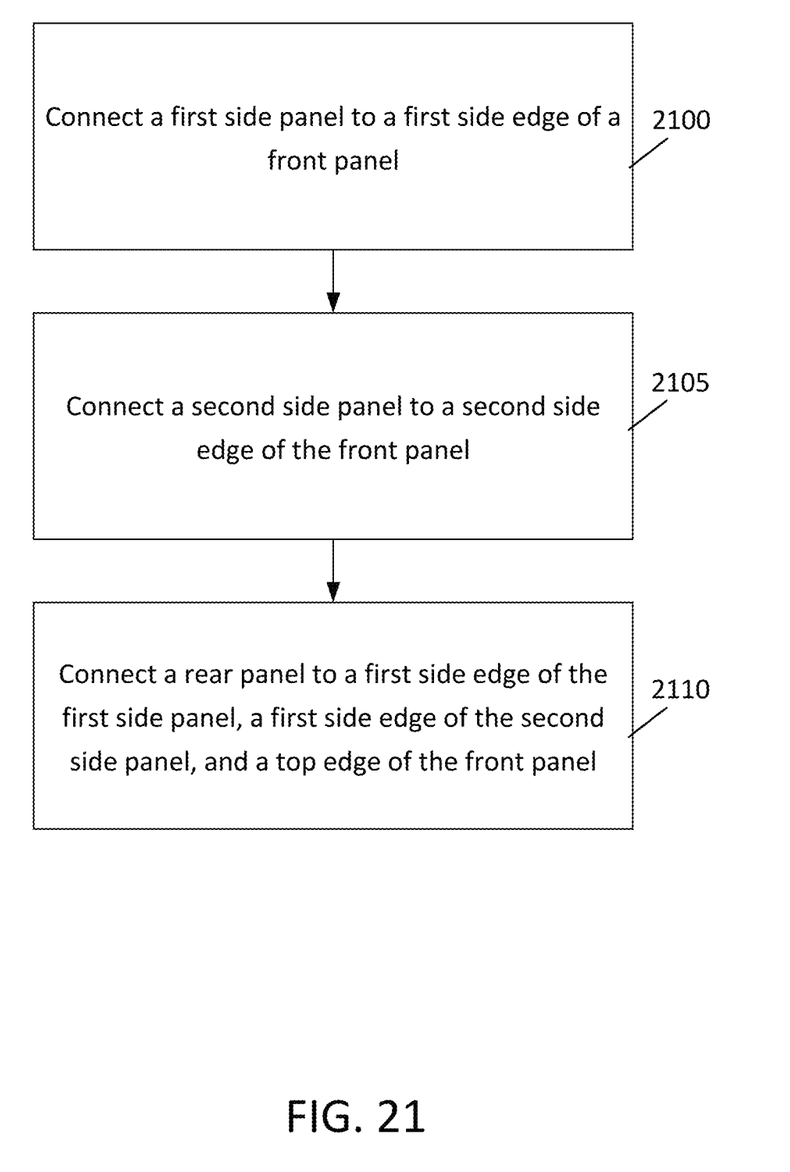
FIG. 21 illustrates an example flow diagram of a method, according to certain example embodiments.

FIG. 21 illustrates an example flow diagram of a method, according to certain example embodiments. As illustrated in FIG. 21, the method may be directed to constructing an image projection and display apparatus. In an example embodiment, the method of FIG. 21 may include, at 2100, connecting a first side panel to a first side edge of a front panel. The method may also include, at 2105, connecting a second side panel to a second side edge of the front panel. The method may further include, at 2110, connecting a rear panel to a first side edge of the first side panel, a first side edge of the second side panel, and a top edge of the front panel. In some example embodiments, the rear panel may include a reflective film disposed thereon, and the rear panel may be disposed at an angle of 90 degrees or less with respective to a horizontal plane of the rear panel. In other example embodiments, the front panel, the first side panel, and the second side panel may include a translucent, transparent, or semi-transparent material configured to diffuse light.

According to certain example embodiments, the rear panel may include at least one brightness film disposed thereon. According to some example embodiments, the rear panel may include at least one reflective film. According to other example embodiments, at least one of the front panel, the first side panel, and the second side panel may include a brightness film disposed thereon.

In certain example embodiments, the rear panel, the first side panel, the second side panel, and the front panel may constitute one single continuous piece. In some example embodiments, the rear panel, the first side panel, the second side panel, and the front panel may constitute separate individual pieces of the image projection and display apparatus. In other example embodiments, the rear panel, the first side panel, the second side panel, and the front panel define a 3-dimensional pyramidal shape.

According to certain example embodiments, the at least one of the first side panel, the second side panel, or the front side panel may include a milky mylar material or a polytetrafluoroethylene plastic material. According to other example embodiments, the first side panel, the second side panel, the rear panel, and the front panel may have a thickness of at least 5 mm, such as, for example, 5 mm to 10 mm.

Certain example embodiments described herein provide several technical improvements, enhancements, and/or advantages. For instance, in some example embodiments, it may be possible to provide a portable and compact way of projecting and displaying content that does not require a projector or projection screen, an application to control, or an energy source. It may also be possible to provide a projection cover that has a unique shape capable of creating a 3D diffusion effect experience from a 2D screen.

One having ordinary skill in the art will readily understand that the invention as discussed above may be practiced with procedures in a different order which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

We claim:

1. An image projection and display apparatus, comprising:
a front panel;
a first side panel connected to a first side edge of the front panel;
a second side panel connected to a second side edge of the front panel; and
a rear panel connected to a first side edge of the first side panel, a first side edge of the second side panel, and a top edge of the front panel,
wherein the rear panel is disposed at an angle of less than 90 degrees with respect to a horizontal plane of the rear panel, and
wherein the front panel, the first side panel, and the second side panel comprise a translucent, transparent, or semi-transparent material configured to diffuse light.

2. The image projection and display apparatus according to claim 1, wherein the rear panel comprises at least one reflective film.

3. The image projection and display apparatus according to claim 1, wherein the rear panel comprises at least one brightness film disposed thereon.

4. The image projection and display apparatus according to claim 1, wherein at least one of the front panel, the first side panel, and the second side panel comprises a brightness film disposed thereon.

5. The image projection and display apparatus according to claim 1, wherein the rear panel, the first side panel, the second side panel, and the front panel constitute one single continuous piece.

6. The image projection and display apparatus according to claim 1, wherein the rear panel, the first side panel, the second side panel, and the front panel constitute separate individual pieces of the image projection and display apparatus.

7. The image projection and display apparatus according to claim 1, wherein the rear panel, the first side panel, the second side panel, and the front panel define a 3-dimensional pyramidal shape or a 3-dimensional triangular prism shape.

8. The image projection and display apparatus according to claim 1, wherein at least one of the first side panel, the second side panel, or the front side panel comprises a milky mylar material or a polytetrafluoroethylene plastic material.

9. The image projection and display apparatus according to claim 1, wherein the first side panel, the second side panel, the rear panel, and the front panel comprise a thickness of at least 5 mm.

10. A method of constructing an image projection and display apparatus, comprising:
connecting a first side panel to a first side edge of a front panel;
connecting a second side panel to a second side edge of the front panel; and
connecting a rear panel to a first side edge of the first side panel, a first side edge of the second side panel, and a top edge of the front panel,
wherein the rear panel is disposed at an angle of less than 90 degrees with respective to a horizontal plane of the rear panel, and
wherein the front panel, the first side panel, and the second side panel comprise a translucent, transparent, or semi-transparent material configured to diffuse light.

11. The method of constructing the image projection and display apparatus according to claim 10, wherein the rear panel comprises at least one reflective film.

12. The method of constructing the image projection and display apparatus according to claim 10, wherein the rear panel comprises at least one brightness film disposed thereon.

13. The method of constructing the image projection and display apparatus according to claim 10, wherein at least one of the front panel, the first side panel, and the second side panel comprises a brightness film disposed thereon.

14. The method of constructing the image projection and display apparatus according to claim 10, wherein the rear panel, the first side panel, the second side panel, and the front panel constitute one single continuous piece.

15. The method of constructing the image projection and display apparatus according to claim 10, wherein the rear panel, the first side panel, the second side panel, and the front panel constitute separate individual pieces of the image projection and display apparatus.

16. The method of constructing the image projection and display apparatus according to claim 10, wherein the rear panel, the first side panel, the second side panel, and the front panel define a 3-dimensional pyramidal shape or a 3-dimensional triangular prism shape.

17. The method of constructing the image projection and display apparatus according to claim 10, wherein at least one of the first side panel, the second side panel, or the front side panel comprises a milky mylar material or a polytetrafluoroethylene plastic material.

18. The method of constructing the image projection and display apparatus according to claim 10, wherein the first side panel, the second side panel, the rear panel, and the front panel comprise a thickness of at least 5 mm.

* * * * *